United States Patent [19]

McDonald

[11] Patent Number: 4,874,226

[45] Date of Patent: Oct. 17, 1989

[54] LICENSE PLATE LENSES

[76] Inventor: Kevin McDonald, 768 Georgia Ave., Akron, Ohio 44306

[21] Appl. No.: 182,117

[22] Filed: Apr. 15, 1988

[51] Int. Cl.[4] .......... G02B 27/00

[52] U.S. Cl. .......... 350/319; 350/252; 40/209; 40/544; 428/542.2

[58] Field of Search .......... 350/319, 322, 252, 257, 350/417; 40/200, 209, 210, 152, 154, 616, 544, 204, 219, 615; 428/31, 79, 542.2

[56] References Cited

U.S. PATENT DOCUMENTS

| | | | |
|---|---|---|---|
| 2,190,571 | 2/1940 | Salducco | 40/209 |
| 2,797,513 | 7/1957 | Edwards, Jr. | 40/209 |
| 4,302,896 | 12/1981 | Bott | 40/209 |
| 4,457,089 | 7/1984 | Phillips, Jr. | 40/544 |
| 4,605,575 | 8/1986 | Auld et al. | 428/542.2 |
| 4,767,673 | 8/1988 | Nakano et al. | 428/542.2 |

*Primary Examiner*—Bruce Y. Arnold
*Assistant Examiner*—Loha Ben
*Attorney, Agent, or Firm*—David M. Lowry

[57] ABSTRACT

License plate lenses to be affixed over the license plate area of automobiles and/or vehicles and carrying a communicative or decorative symbol to the car enthusiasts liking. The lenses are constructed from a plurality of plastics with a logo and/or design vacuum formed into the various plastic materials.

5 Claims, 2 Drawing Sheets

LICENSE PLATE LENSES

BACKGROUND AND SUMMARY OF THE INVENTION

This invention relates to a novel and useful type of License Plate Lens. Car enthusiasts often search for new and interesting concepts to add flair and color to their automobiles. The present invention relates to license plate lenses. Specifically, the license plate lenses are affixed over the license plate area and carry either a decorative or communicative symbol to the car enthusiast's liking. With todays requirement that license plates remain unobscured in most States and jurisdictions, the license plate lenses must be unobtrusive and nonhindering. As such, this invention relates to a new and novel type of license plate lens which may be utilized without hinderance to the license plate nomenclature and provides other desirable and interesting features. Specifically, these license plate lenses are vacuum formed from various types of plastics and are easily installable upon the license plate holders appearing as standard equipment on most automobiles. In addition, the license plate lenses are manufactured out of either a clear or slightly shaded off-color of plastic in order to enable one to see through the license plate lens and read the nomenclature and/or numbers appearing on the license plate. Also, the lenses provide a means wherein the license plate remains clean and unencumbered by dirt, grime and other road by-products. This is particularly important and desirable to an individual desiring to keep either a historical or valuable license plate in mint condition. Other objects and advantages of the instant invention are shown and disclosed by the drawings and in the following detailed description of the drawing. It is a principal object of the present invention to provide license plate lenses for installation and/or attachment to the license plate holders of automobiles. The license plate holders are provided with standard orifices coinciding to the screws and nuts of license plate holders appearing as standard equipment on most automobiles sold in this country and throughout the world. The license plate lenses are vacuum formed from a plurality of plastics readily available on the plastic's market and carry a decorative or communicative symbol and/or logo. Practically any logo and/or design can be pressed into the various plastic sheeting and affixed to the license plate holder with standard screws and bolts.

It is a further object of the aforementioned invention to provide a license plate lens with a plurality of raised surface areas in a specific geometrical design so as to provide a lens with a louvered look. A further review of this invention will indicate that it is an additional object of this invention to create a means to provide the capability of providing a communicative or decorative symbol on the license plate while retaining the unobscured nature of the underlying license plate.

From the foregoing, it will also be seen that still another object of this invention utilizes the license plate lens as a means wherein the license plate may be kept free of dirt, grime, and other road by-products. Details of the foregoing objects and of the invention, as well as other objects thereof, are set forth in the following specifications and illustrated in the accompanying drawings comprising of the parts thereof.

DETAILED DESCRIPTION OF INVENTION

Figure 1:
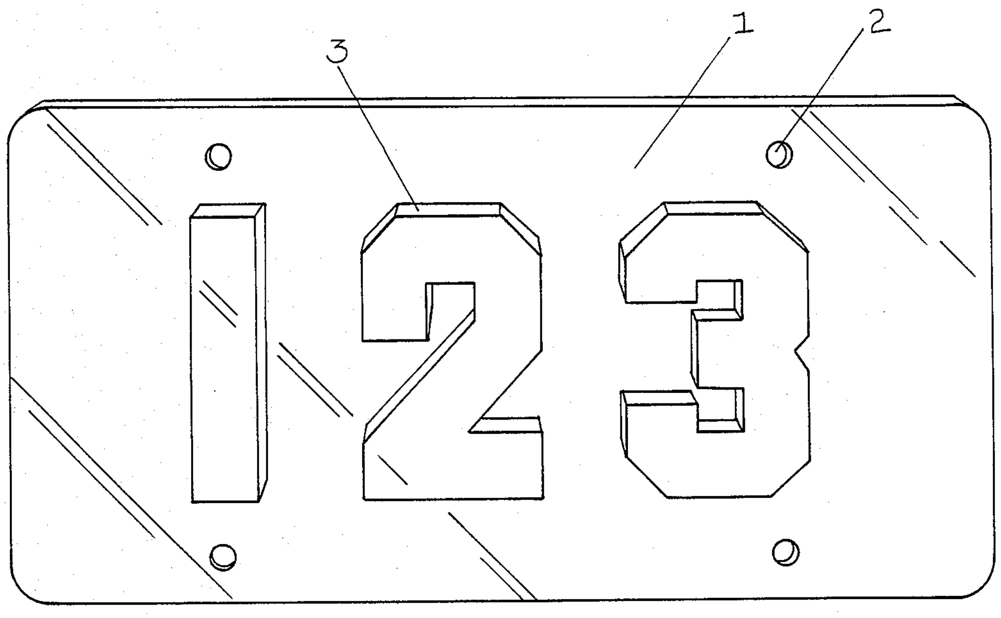
FIG. 1. is a front view of a sample license plate lens showing the raised enhancement of lettering and the localized orifices matching the existing nut and screw combination on automobiles license plate holders.
Figure 2:
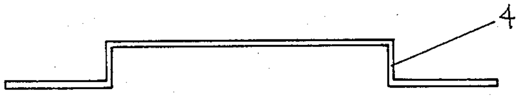
FIG. 2. is a representative plan view of the license plate lens alluded to in FIG. 1 demonstrating the vacuum formed aspect of the lettering contained therein.

In general, the license plate lens of the present invention comprises a flattened sheet of polyethylene plastic or other rigid plastic approximately 0.0005 inch thick formed so as to coincide approximately with the size of the standard license plate. Plurality of holes coinciding with the standard holes provided in an automobile license plate holder are then provided in the lens in order to enable a means for attachment to the vehicle. As mentioned earlier, the license plate lenses may, in a particular embodiment be comprised of a material being clear and/or visually unobtrusive in nature. Various pigments may be added to the plastic in order to provide a "smoked" look or a tinting aspect in any color that the individual desires. The simplest embodiment conceived in this present invention relates to a license plate lens with no nomenclature or labeling appearing in the face thereof. The lenses may, however, be modified to carry the logo or design of practically anything. The appropriate logo/design is formed during the manufacturing process so as to provide a raised or enhanced surface extending at a vertical aspect to the horizontal plane of the actual license plate lens. This nomenclature and/or design then becomes clearly visible to a spectator or passerby due to the dichotomy between the license plate lens and the license attached to the lens or other background. Various nomenclature and/or advertising may be affixed into the license plate lens in a convenient and viewable manner. The construction and arrangement is such as to enable the very low cost of manufacture and production of a very light weight yet durable device comprised of only one major part which can conceivably have a variety and plurality of colors. The invention may be modified to provide the advantages commensurate with this disclosure and the instant drawings. It is, therefore, intended that the claims attached hereto be construed to include the modifications conceivable in accordance with the drawings and other data contained herein.

According to FIG. No. 1, a license plate lens 1 according to the present invention as shown. The license plate lens is rectangular in nature coinciding to the approximate measurements of a standard license plate. Preferably, license plate lens 1 is slightly larger in size than the license plate or other object appearing thereunder. Characteristically, the lens on its long axis is roughly the equivalent of twelve (12) inches. The license plate lens on its short axis is approximately six (6) inches in length. A plurality of orifices, such as 2 are provided in a geometrical pattern commensurate with the nut and bolt arrangement of existing license plate holders indigenous to most, if not all, automobiles. Said orifices providing a means wherein the license plate lens is readily affixed and/or attached to the license plate holder. Nomenclature and/or designs such as that evidenced by 3 are vacuum formed in the lens thereby forming a raised and enhanced surface. When contrasted with the background of the license plate holder or other object, the nomenclature and/or design becomes readily apparent to the naked eye.

Referring now to FIG. No. 2 the figure demonstrates the raised and/or enhanced surface area formed into the lens plate therby creating an enhanced or raised surface.

Figure 3:
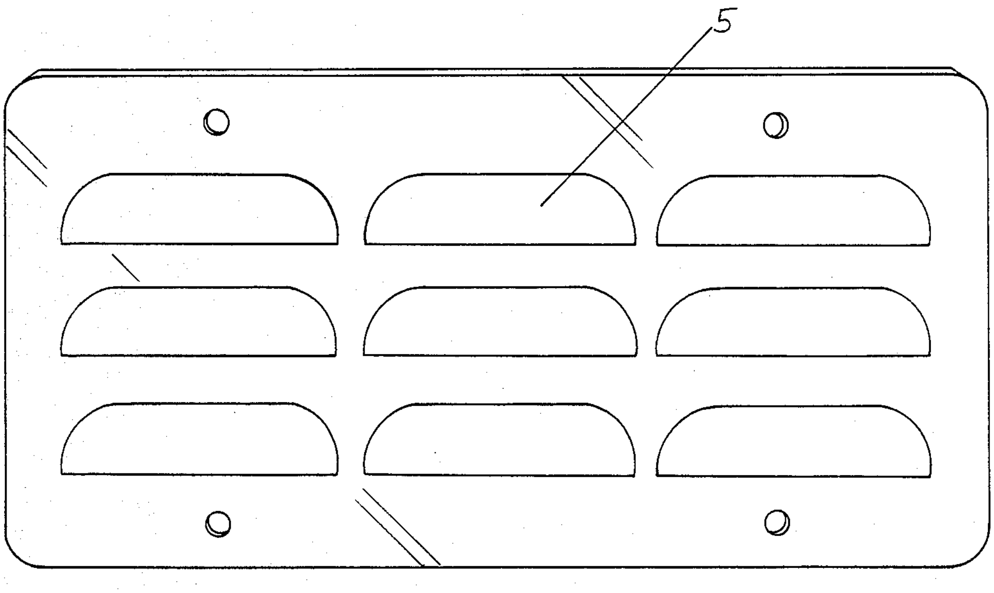
FIG. 3. is a front view of a preferred embodiment of the instant invention, namely a louvered lens plate. Said plate showing a plurality of geometrically spaced vacuum formed pockets in a louvered like fashion.
Figure 4:
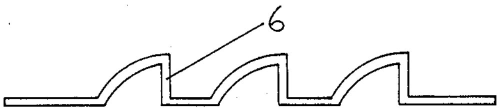
FIG. 4. is a side view of the aforementioned FIG. 3, showing the vacuum formed areas in the lens plate, thus forming a louvered like enhancement.

Referring to FIGS. No. 3 and 4, a preferred embodiment of the invention is shown. Specifically, a louvered lens. The FIG. 3 lens contains a plurality of raised and enhanced areas 5 vacuum formed into the license plate lens. The plurality of impressed areas thereby creating a louvered look when contrasted against the characteristic background of either the license plate holder and/or other device. Referring to FIG. No. 4, the plurality of enhanced areas 6 are shown in a cross sectional view indicating the vacuum formed nature of the raised and enhanced area.

In use, the license plate lens 1 is firmly attached and-/or affixed to the license plate holder to form an integral surface therewith. The lens then provides a means wherein decorative and/or other nomenclature is exhibited against the license plate holder or other background.

Obviously, there are numerous possible variations in the functional construction of a license plate lens for fixation over a license plate holder. The exact construction will depend upon the nomenclature and/or symbol that is desired to be vacuum formed into the license plate lens. In practice, any logo, nomenclature, or design can be effectively, efficiently, and at low cost be placed in the license plate lens. All of the aforementioned variations are conceivable, imaginable, and obvious to one skilled in the art. Thus, the invention hereto is not limited thereto and the modifications in variation obvious to one skilled in the art are incorporated herein without departing from the scope of the instant invention.

What I claim is:

1. A license plate lens, comprising:

(a) a rectangularly-shaped plastic lens having a plurality of orifices so as to coincide with a license plate holder of most, if not all, automobiles, and;

(b) a logo or other nomenclature vacuum-formed in said plastic lens so as to create a raised and enhanced surface in said lens.

2. The license plate lens as contained in claim 1, wherein the license plate lens is constructed of polyethylene or other plastic material.

3. The license plate lens of claim 2, wherein the license plate lens material contains pigments of such a nature so as to provide a tinted license plate lens permitting visual acuity through the license plate lens.

4. The license plate lens of claim 1, wherein the raised and enhanced surface consists of a plurality of vacuum-formed impressions presenting an outwardly convexed appearance.

5. The license plate lens of claim 1, wherein the raised and enhanced surface consists of a plurality of vacuum-formed impressions presenting a louvered appearance.

* * * * *